United States Patent [19]
Burgemeister

[11] Patent Number: 4,465,932
[45] Date of Patent: Aug. 14, 1984

[54] METHOD AND APPARATUS FOR THE DETECTION OF IONIZING RADIATION

[75] Inventor: Eduard A. Burgemeister, Abcoude, Netherlands

[73] Assignee: N.V. Optische Industrie "De Oude Delft", Netherlands

[21] Appl. No.: 302,297

[22] Filed: Sep. 14, 1981

[30] Foreign Application Priority Data

Nov. 19, 1980 [NL] Netherlands ..................... 8006321

[51] Int. Cl.³ .............................................. G01T 1/22
[52] U.S. Cl. .................................................. 250/370
[58] Field of Search ....................... 250/336, 370, 371; 156/DIG. 68

[56] References Cited

U.S. PATENT DOCUMENTS

| | | | |
|---|---|---|---|
| 2,694,112 | 11/1954 | McKay | 250/370 |
| 2,806,145 | 9/1957 | Cotty | 250/83.3 |
| 3,665,193 | 5/1972 | Kozlov et al. | |
| 4,045,674 | 8/1977 | Vermeulen | 250/370 |

OTHER PUBLICATIONS

Kaiser et al., "Nitrogen, A Major Impurity in Common Type I Diamond", Phys. Review 115, No. 4, (1959), pp. 857-863.
Konorova et al., "Ionization Currents in Diamonds During Irradiation with 500-1000 KeV Electrons", Soviet Physics/Solid State 8, No. 1, (1966), pp. 1-5.
Chrenko, "Boron, the Dominant Acceptor in Semiconducting Diamond", Physical Review B, 7, No. 10, (1973), pp. 4560-4567.
Kozlov et al., (1974), Nuclear Instruments and Methods 117:277-283.
Friedman et al., (1947), Physical Review 73:186-187.
Sellschop (Field Ed.), The Properties of Diamond, (1979, Academic Press), pp. 136-139.
Berman (Ed.), Physical Properties of Diamond, (1965, Clarendon Press, Oxford), pp. 356-371.
Bampton, (Feb. 1976), Industrial Diamond Review, pp. 55-59.
Canali et al., (1979), Nuclear Instruments and Methods 160:73-77.
"Nuclear Radiation Detector Made of Diamond", E. A. Konorova and S. F. Kozlov, Soviet Physics–Semiconductors, vol. 4, No. 10, Apr. 1971, pp. 1600-1605.
"Diamond Dosimeter for X-Ray and γ-Radiation", S. F. Kozlov, et al., IEEE Transactions on Nuclear Science, vol. NS-24, No. 1, Feb. 1977, pp. 235-237.
"Preparation and Characteristics of Natural Diamond Nuclear Radiation Detectors", S. F. Kozlov, et al., IEEE Transactions on Nuclear Science, vol. NS-22, Feb. 1975, pp. 160-170.
"Differences Between Counting and Non-Counting Diamonds", G. P. Freeman and H. A. Van Der Velden, Physica XVIII, No. 1, Jan. 1952, pp. 9-19.
"A Nuclear Radiation Counter with a Diamond Detector", W. F. Cotty, Industrial Diamond Review, vol. 16, Jul. 1956, pp. 133-135.
Caveney (Field Ed.), The Properties of Diamond, (1979, Academic Press), pp. 628-631.
Planskoy, (1980), Phys. Med. Biol. 25(3):519-532.

Primary Examiner—Janice A. Howell

[57] ABSTRACT

A method and an apparatus for the detection of ionizing radiation, in which a diamond is used as the radiosensitive element of the detecting apparatus, which diamond has low ($2 \times 10^{-3}$ at .% or less) nitrogen concentration and low ($10^{-4}$ or less) birefringence, and in which diamond the lifetime of the free carriers generated by the ionizing radiation is $10^{-6}$ s or longer. The current-voltage characteristic of the diamond under irradiation is linear at low bias voltage and the dose rate can be determined from the resistivity of the diamond. A synthetic diamond crystal can be used to advantage as the radiosensitive element.

15 Claims, 5 Drawing Figures

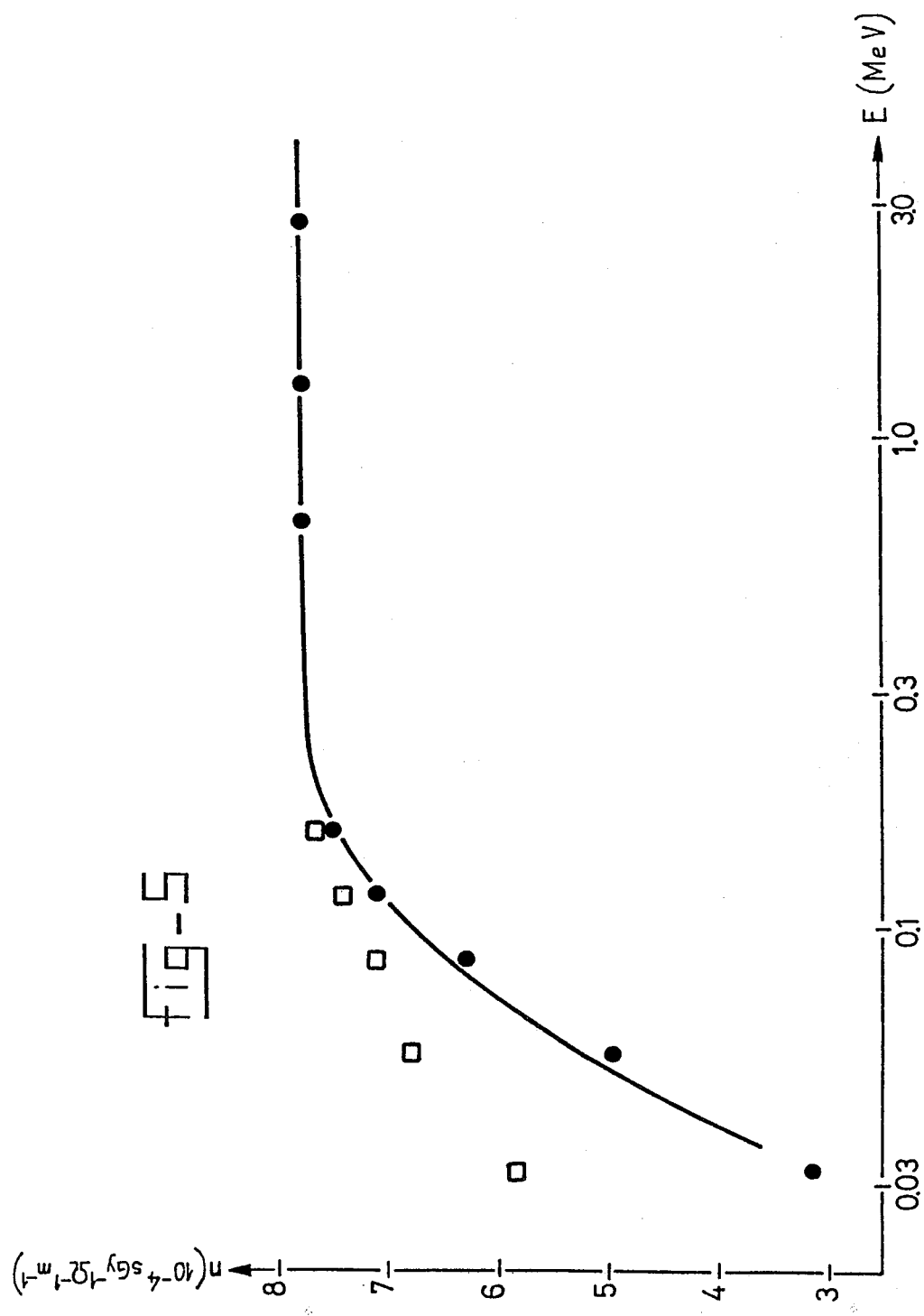

METHOD AND APPARATUS FOR THE DETECTION OF IONIZING RADIATION

The invention relates to a method for the detection of ionizing radiation by means of a diamond detector and the construction thereof.

Such a method and such a diamond detector are known in practice. Thereby one had tried to start from so-called counting natural diamonds which were intended to be used as pulse counters for the detection of ionizing radiation. These diamond detectors have as important advantages among others that they are of small size and that they are nearly equivalent to human tissue with respect to absorption of radiation as a function of quantum energy. However, up to the present, diamond counters have not been produced in quantity, because the selection of diamonds to be used as counters is a laborious process.

It is the object of the invention to obviate the said problem. It is another object of the invention to provide a method which meets the existing needs of good detection and dosimetry of ionizing radiation in a relatively simple way. In the accomplishment of said objects of the invention a diamond is used as the radiosensitive element of the detector, which diamond has low ($2 \times 10^{-3}$ at.% or less) nitrogen concentration and low ($10^{-4}$ or less) birefringence, and in which diamond the lifetime of the free carriers generated by the ionizing radiation is $10^{-6}$ s or longer.

Because the free carriers generated by ionizing radiation are trapped at impurities in the diamond crystal, only the purest diamonds are suitable for use as detector elements. Diamonds can be preselected optically in terms of purity as regards to low nitrogen concentration by transparency in ultraviolet or infrared light of certain wave lengths, and as regards to small strain in the crystal lattice by low birefringence.

According to the invention it appears that a nitrogen concentration less than $2 \times 10^{-3}$ at.% ($3.5 \times 10^{18}$ cm$^{-3}$), a birefringence less than $10^{-4}$ and a lifetime of free carriers of $10^{-6}$ s or longer are essential conditions for good radiosensitivity of a diamond.

When such a detector is irradiated, whereby a low bias is applied across the diamond crystal, the current becomes steady after some time and the current-voltage characteristic is linear. Therefore the diamond can be used as a radiosensitive resistor. It turns out that the resistivity is almost inversely proportional to the dose rate of the radiation. In a diamond detector used in the said method, and the element of which consists of the said diamond having low nitrogen concentration and low birefringence, the free carriers generated by ionizing radiation have a relatively long lifetime of $10^{-6}$ s or more, as indicated above. Such a lifetime is of great importance as from this follows that already at low bias voltages the freed carriers have a lifetime larger than the transit time between the electrodes. The photoconductive gain of the ionization current has a value larger than one, despite the fact that a part of the free carriers is trapped in the crystal. This condition strongly differs from the phenomena of the diamond counters designed up to the present in which the lifetime of free carriers is relatively short, namely $10^{-8}$ s or less.

However, not all natural diamonds, which are preselected optically in the above mentioned way, meet the conditions of the said lifetime of free carriers of $10^{-6}$ s or longer. Therefore, preselected natural diamonds have to be tested individually with a suitable radioactive source and those which can be used as a suitable radiosensitive element are extremely rare.

Thus, according to the invention, a synthetic diamond crystal having the said properties is used advantageously as the radiosensitive element. Synthetic diamond crystals are manufactured at high temperature and high pressure from carbon.

In the diamond detector of the invention the synthetic diamond crystal has such a major dimension in the range of 0.3 to 1 mm, e.g. 0.8 mm, and such a volume in the range of 0.03 to 1 mm$^3$, e.g. 0.5 mm$^3$, that it can be used advantageously in radiotherapy or for personal monitoring.

Low-ohmic graphite layers are prepared or deposited at two opposite faces of the crystal for the connection of the electrodes. Since light influences the operation of some diamonds, the element is encapsulated in material which is impermeable to light and, of course, electrically insulating. For the use in radiothperapy, the element is mounted preferably with axial symmetry in the top of a probe, which is impermeable to water in order to use the detector in a water phantom. For such calibrations a rigid probe is desirable whereas for the use inside cavities of the human body a flexible probe has advantages.

It is known from the work by Kozlov and Konorova published in the U.S. Pat. No. 3,665,193 and in "Soviet Physics-Semiconductors" 4 (1971) pages 1600 to 1605 to use selected natural diamonds as pulse counters. Since the lifetime of free carriers in these counters is only $10^{-9}$ to $10^{-8}$ s they applied thin diamond plates and/or high bias values in order to achieve complete charge collection. These research workers reported together with others in "IEEE Transactions on Nuclear Science" vol. NS-24 (1977) pages 235 to 237 that these detector plates of selected natural diamonds could be applied in medical radiology. However, the relatively short lifetime of free carriers is a limiting factor.

The invention will be explained with reference to the drawings in which the results of measurements on a diamond having a lifetime of free carriers of $1.3 \times 10^{-5}$ s are shown and in which:

FIG. 5 is an example of the measurement points of the sensitivity of the detector against effective quantum energy.

In carrying out the method according to the invention, graphite layers having a thickness of about 0.01 mm are deposited on two opposite faces of the crystal of 1 mm length for the connection of thin electric wires by means of a small drop of silver paint. Subsequently, the diamond is mounted in a polytetrafluoroethylene (PTFE) tube which is placed with axial symmetry in the top of a long stainless steel needle of 2.0 mm diameter and 0.1 mm wall thickness.

A bias V is applied across the diamond crystal and the current is measured. When not irradiated, the diamond crystal is an insulator; it was found that the resistivity $\rho_o$ is higher than $10^{12}$ ohm.m. However, when the diamond detector is irradiated with, for instance, electron beams, gamma-rays from a $^{60}$Co or other sources, or with pulsed X-rays from a linear accelerator, the current stabilizes within some time. This current is linearly dependant on the voltage up to an electric field of about 50 Volt mm$^{-1}$. At higher fields the current-voltage characteristic is slightly concave. The resistivity $\rho$ is determined below 50 Volt mm$^{-1}$ and turns out to be about inversely proportional to the dose rate D over a wide range. The sensitivity, defined as $n=\rho^{-1}D^{-1}$, is linearly dependent on the temperature of the detector by $-0.5\%$ per °C. near room temperature and is independant of the quantum energy, provided that the value is higher than about 0.3 MeV.

Figure 1:
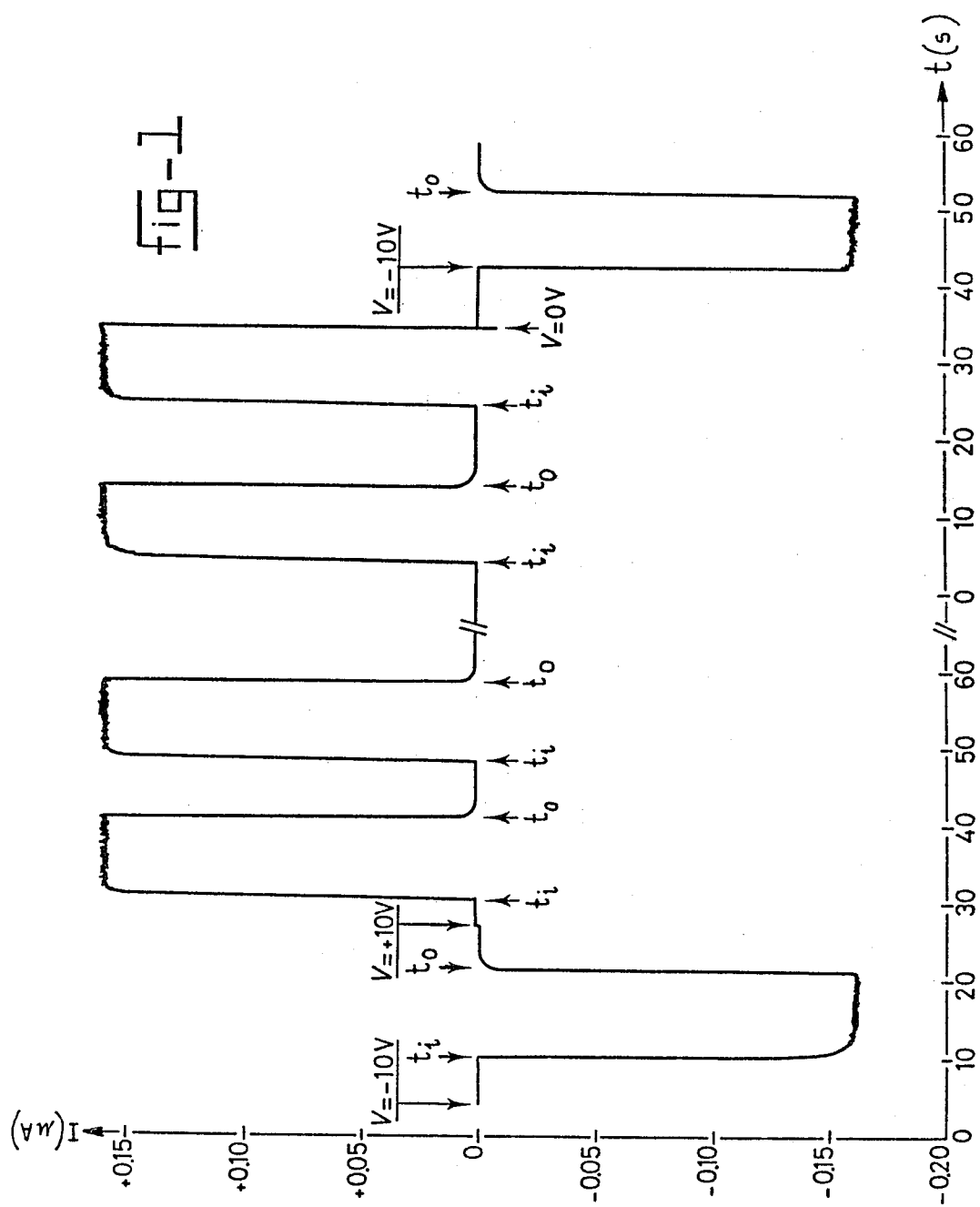
FIG. 1 is an example of the current as a function of time when the detector is irradiated with gamma-rays.

FIG. 1 shows the current response of an embodiment of a diamond detector to several irradiation pulses from a $^{60}$Co source with $D=2.77\times 10^{-2}$ Gy s$^{-1}$. The arrows at $t_i$ and $t_o$ indicate the moments at which the beam is switched on and off respectively and the arrows at the values of V indicate the moments at which those voltages are applied. A small effect is observable after switching on the irradiation beam, after several seconds the current is steady, and after switching off the beam there is some residual current. These switching effects are negligible when the detector is used in radiotherapy or for personal monitoring. They are caused by the trapping of carriers and/or the stabilization of the photoconductive gain. The absolute value of the current remains the same when reversing the polarity illustrating that the contacts via the graphite layers are symmetrical and ohmic.

Figure 2:
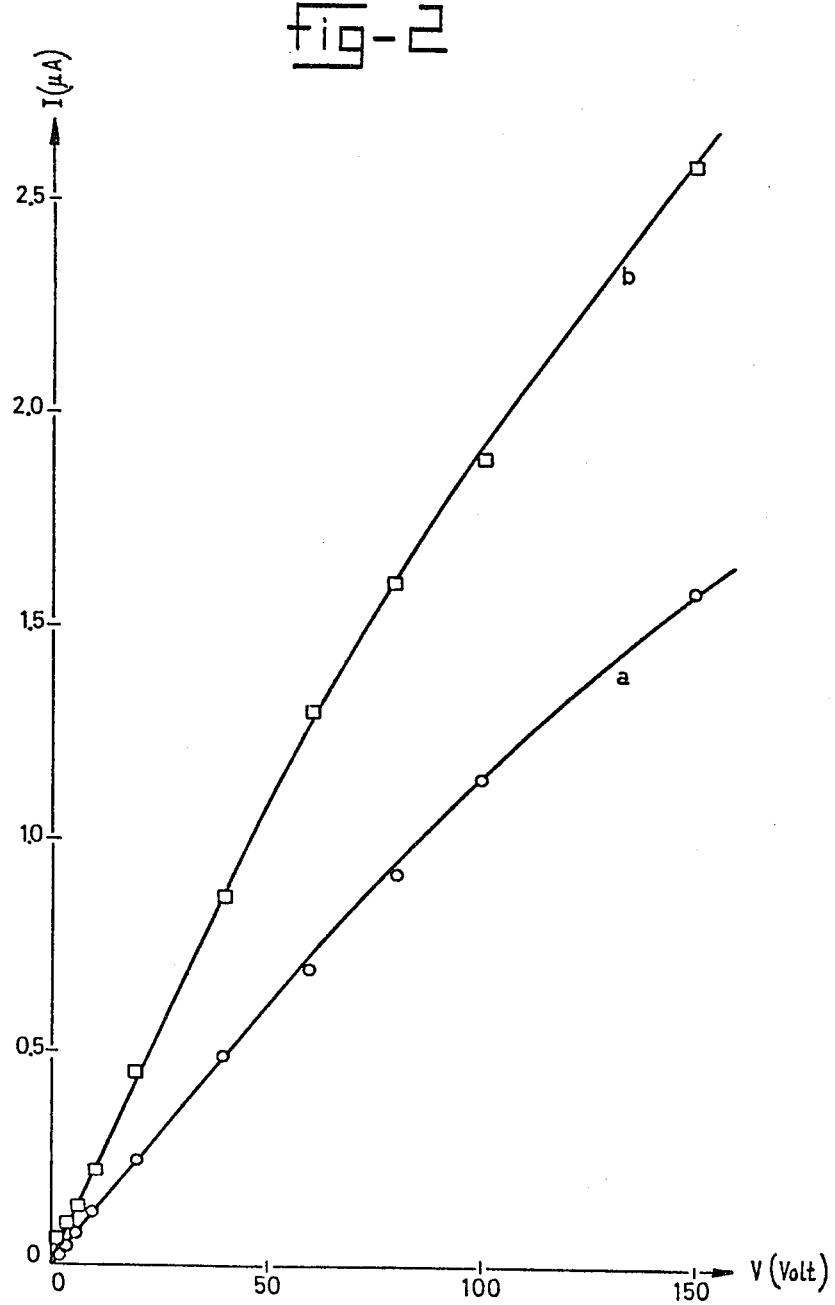
FIG. 2 is an example of two current-voltage characteristics of the detector under continuous gamma- and pulsed X-rays.

FIG. 2 shows typical results for irradiations of the detector with gamma-rays from a $^{60}$Co source (curve a) and also with pulsed X-rays from an 8 MeV linear accelerator having a frequency of 400 s$^{-1}$ (curve b). For the gamma-rays $D=2.00\times 10^{-2}$ Gy s$^{-1}$ and for the X-rays $D=3.50\times 10^{-2}$ Gy s$^{-1}$. Such values for the dose rate are normally used in radiotherapy institutes. The current-voltage characteristics are linear (within 5% accuracy) up to about 50 Volts and are slightly concave at higher voltages. Therefore, for voltages below 50 Volts which are generally to be applied, the diamond crystal operates as a radiosensitive resistor. The resistivity of the diamond, as derived from the current-voltage characteristics and the diamond shape, appears to be almost inversely proportional to the dose rate. The values of the resistivity associated with said characteristics are $\rho=75\times 10^3$ and $36\times 10^3$ ohm.m for $D=2.00\times 10^{-2}$ and $3.5\times 10^{-2}$ Gy s$^{-1}$, respectively. For the use of the detector in radiotherapy the ratio of signal current to dark current is thus larger than $10^7$.

Figure 3:
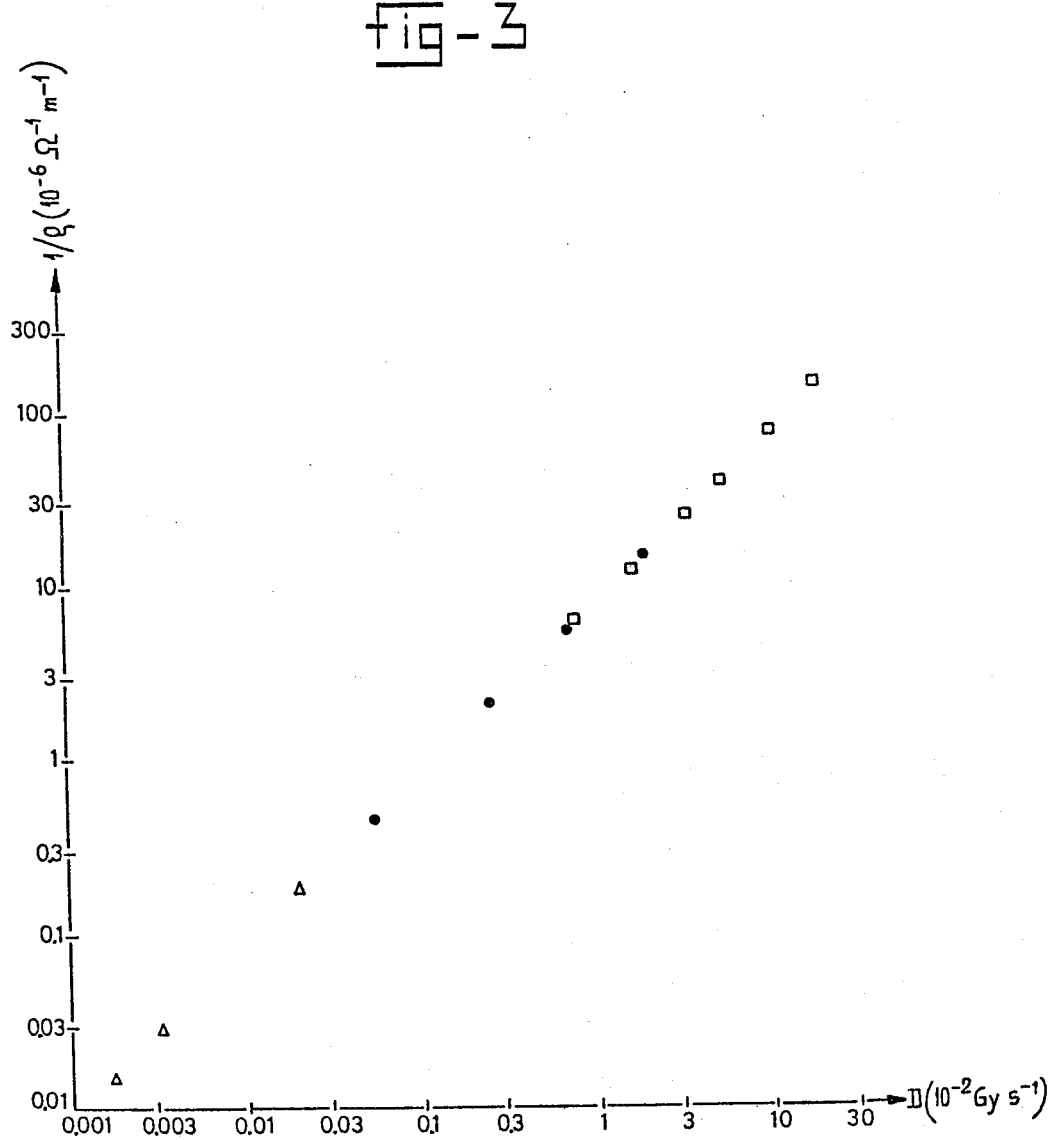
FIG. 3 is an example of the measurement points of conductivity against dose rate for irradiation of the detector with continuous gamma- and pulsed X-rays.

The conductivity or $1/\rho$ is plotted in FIG. 3 against the dose rate D. The triangles represent results for gamma-rays of 0.66 MeV from $^{137}$Cs needles. The circles and squares represent results for gamma rays from a $^{60}$Co source and X-rays from an 8 MeV linear accelerator respectively, having effective energies of 1.25 and 2.7 MeV respectively. This graph shows that the conductivity is practically linearly dependant on the dose rate over more than four decades. It follows from these results that the sensitivity $n=7.8\times 10^{-4}$ s Gy$^{-1}$ ohm$^{-1}$ m$^{-1}$. This value applies to room temperature and to gamma- and X-ray quanta having effective energies of the order of 1 MeV. The sensitivity in electron beams turns out to be slightly lower depending on the mean energy of the electrons.

Figure 4:
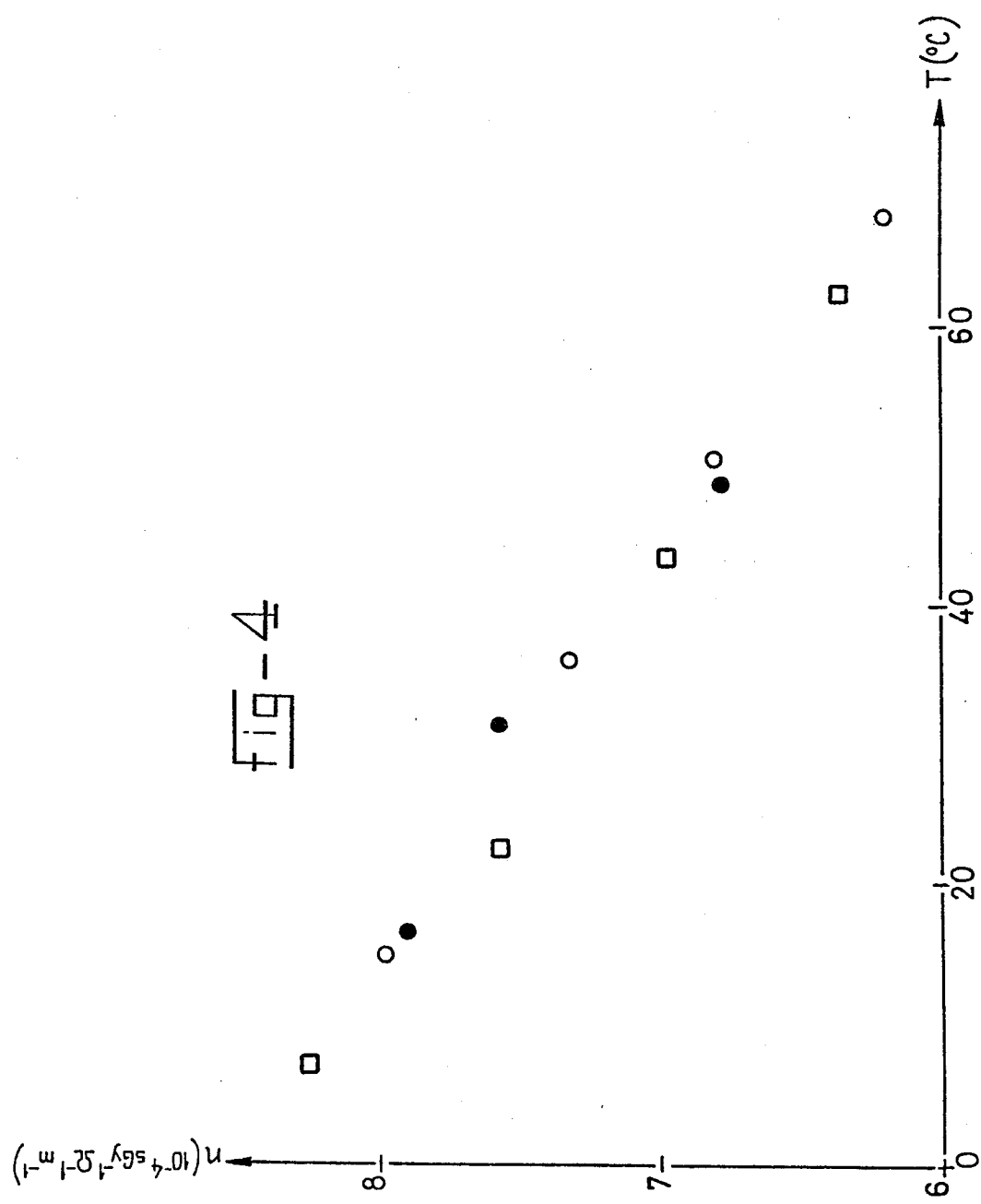
FIG. 4 is an example of the measurement points of the sensitivity of the detector against temperature.

The results of the sensitivity n are plotted in FIG. 4 against the temperature of the detector under gamma- and pulsed X-rays at dose rates of about $2.0\times 10^{-2}$ Gy s$^{-1}$. Circles represent results for the $^{60}$Co source and squares those for the 8 MeV accelerator. It can be inferred from this graph that the sensitivity varies with temperature by $-0.5\%$ per °C. near room temperature. This variation is rather small and correction can be easily applied when the probe is used at a known temperature which differs from 20° C. This temperature correction is much simpler than that for surface barrier detectors made from silicon or other semiconductor materials.

No radiation damage in terms of reduction of the sensitivity is observed in these measurements. This is evident from FIG. 4 where the open and filled circles represent results obtained at an early stage and at the last stage of the series of irradiations up to a total dose of about 5 kGy.

The responses of the probe to X-rays having various energies in the 0.1 MeV range are again proportional to the dose rate and therefore values of the sensitivity are again derived. They are plotted in FIG. 5 against the effective quantum energy together with the values at higher energies. The curve is drawn through the circles representing results for the diamond in a stainless steel casing of 0.1 mm thickness. This graph shows that the sensitivity depends to some extent on the energy. The squares represent results of the diamond in a thin aluminium shielding. FIG. 5 thus shows that the energy dependence is mainly caused by shielding and only to a minor part by the diamond itself.

The energy dependence of any detector for medical application is determined by the difference of its atomic number and the effective atomic number of human-soft-tissue which is 5.92 for fat and 7.42 for muscle. Therefore diamond (Z=6) is specially suitable for dosimetry in the radiotherapy. FIG. 5 shows that the design of the embodiment of the detector can be improved by using a more tissue-equivalent casing. However, the energy dependence of the described probe is already much less than that of any other semiconductor detector.

The advantageous application of such a diamond crystal having low nitrogen concentration, low birefringence and long lifetime of free carriers as a radiosensitive resistor is attributed to its photoconductive gain. According to a known model which is based on the mechanism of photoconductivity, the current can be determined from the equation:

$$I=(e\mu\tau/L^2)VF \qquad (1)$$

where e is the electron charge, $\mu$ the mobility of free electrons, $\tau$ the lifetime of free carriers, V the voltage over the diamond having an electrode spacing L, and F is the number of electron-hole pairs generated per second. Assuming that neither $\mu$ nor $\tau$ are voltage-dependent, equation (1) shows that the model accounts for the observed operation of the diamond as a resistor. It is possible that either free electrons or free holes are trapped at impurities in the crystal in a dominant way.

The value of $\tau$ in equation (1) is derived from the measurements. For the described diamond having a weight of 2.81 mg it can be shown that $$F=(1.75\times 10^{13}/\epsilon)D, \qquad (2)$$

where F and D are expressed in $s^{-1}$ and $Gy\ s^{-1}$ respectively, and where $\epsilon$ in eV represents the effective energy for creation of electron-hole pairs. Using $\epsilon=13$ eV and $\mu=2\times 10^3$ $cm^2 V^{-1}\ s^{-1}$ it follows that $\tau=1.3\times 10^{-5}$ s.

The transit time of free carries is given by:

$$T=L^2/\mu V \qquad (3)$$

Equations (1) and (3) give $$I=eF\tau/T \qquad (4)$$

where the factor $\tau/T$ is usually called photoconductive gain. For $\tau/T>1$, many free carriers stream rapidly across from one electrode to the other during the time that one electron-hole pair remains un-recombined. It follows for the diamond measured that $\tau/T=\alpha V$, with $\alpha=2.6\ Volt^{-1}$, and thus large gain factors are observed.

In general it is posed that a good radiosensitive diamond according to the invention operates as a radiosensitive resistor having the following properties, that the resistivity is practically inversely proportional to the dose rate in a wide range;

the ratio of signal current to dark current is very high;

reading of the dose rate during irradiation is possible; and that temperature correction can easily be applied.

Therefore the diamond detector is suitable for many applications such as in nuclear physics and in space research, where the operation of the detector at extreme temperatures or in corrosive environments provides a further advantage. Moreover, radiation damage only occurs at a very high dose depending on the kind and energy of the radiation. An application might be in industry where welding-tests and crack-research are made with radioactivity. Further applications in nuclear medicine or Röntgendiagnostics are possible. With respect to radiotherapy, however, these medical applications involve much lower dose rates or much shorter exposures and therefore the diamond detector should be primed or should operate as a pulse counter.

The diamond as radiosensitive resistor requires only very simple equipment; a small electronic amplifier, an mA-meter and a stabilized power supply or battery. Therefore, the diamond detector can be used for radiation protection and as the element of a personal monitor in which an electronic alarm and integrator are built in.

Other properties of the diamond detector in relation to the use in radiotherapy institutes are that the detector volume is about 0.5 $mm^3$ which allows point measurements;

the detector is composed basically of carbon and thus is nearly equivalent to human tissue;

the detector operates at low voltage; and the detector is not fragile and can be heat sterilized.

Due to these properties the diamond detector can be used for the dosimetry of ionizing radiation in vivo. The diamond detector is a good suppletion to the systems for dosimetry in radiotherapy. These are mainly air-filled ionisation chambers of e.g. 600 $mm^3$, not tissue-equivalent surface barrier detectors of silicon and dosimeters measuring only total dose by means of thermoluminescence or filmblackness.

I claim:

1. A method for the detection of ionizing radiation by the use of a diamond as the radiosensitive element including the steps of applying an electrical bias across the diamond having low ($2\times 10^{-3}$ at.% or less) nitrogen concentration and low ($10^{-4}$ or less) birefringence, and exposing the diamond to ionizing radiation generating thereby free carriers with a lifetime of $10^{-6}$ s or longer.

2. A method for the detection of ionizing radiation by the use of a diamond as the radiosensitive element including the steps of applying an electrical bias across the diamond having low ($2\times 10^{-3}$ at.% or less) nitrogen concentration and low ($10^{-4}$ or less) birefringence, and exposing the diamond to ionizing radiation generating thereby free carriers with a lifetime of $10^{-6}$ s or longer, whereby the current-voltage characteristic is linear at low voltage (50 Volt $mm^{-1}$ or less) when the diamond is exposed to the ionizing radiation, and including the step of determining the dose rate from the resistivity of the diamond.

3. A method according to claim 1 or 2, characterized in that a synthetic diamond crystal is used as the radiosensitive element.

4. A method according to claim 1 or 2 wherein said ionizing radiation is radio therapeutic and is selected from the group consisting of electron beams, gamma- or X-rays and said method includes the step of determining the dose of said radiation administered.

5. A method according claim 1 used for personal monitoring and radiation protection.

6. A diamond detector for the detection of ionizing radiation characterized in that the radiosensitive element of the detector consists of a diamond with low ($2\times 10^{-3}$ at.% or less) nitrogen concentration and low ($10^{-4}$ or less) birefringence, and in which the lifetime of the free carriers generated by the ionizing radiation is $10^{-6}$ s or longer.

7. A diamond detector according to claim 6, characterized in that the radiosensitive element is a synthetic diamond crystal.

8. A diamond detector according to claims 6 or 7, characterized in that the diamond crystal has a major dimension in the order of 0.3 to 1 mm and a volume in the order of 0.03 to 1 $mm^3$, and that graphite layers on two opposite faces of the diamond serve as ohmic contacts of the electrodes.

9. A diamond detector according to claim 6, characterized in that the diamond is mounted preferably with axial symmetry in an electrically insulating material and subsequently in the top of a probe which is impermeable to light and water.

10. A method according to claim 2 wherein said ionizing radiation is radiotherapeutic and is selected from the group consisting of electron beams, gamma rays or X-rays, and said method includes the step of determining the dose of said radiation administered.

11. A method according to claim 3 wherein said ionizing radiation is radiotherapeutic and is selected from the group consisting of electron beams, gamma rays or X-rays, and said method includes the step of determining the dose of said radiation administered.

12. A method according to claim 2 used for personal monitoring and radiation protection.

13. A method according to claim 3 used for personal monitoring and radiation protection.

14. A diamond detector according to claim 7 characterized in that the synthetic diamond is mounted preferably with axial symmetry in an electrically insulating material and subsequently in the top of a probe which is impermeable to light and water.

15. A diamond detector according to claim 8, characterized in that the diamond, having graphite electrical contacts, is mounted preferably with axial symmetry in an electrically insulating material and subsequently in the top of a probe which is impermeable to light and water.

* * * * *